Jan. 6, 1948.　　　　L. A. MARIHART　　　　2,433,856
APPARATUS FOR USE IN AGRICULTURAL MACHINES
Filed Feb. 3, 1945
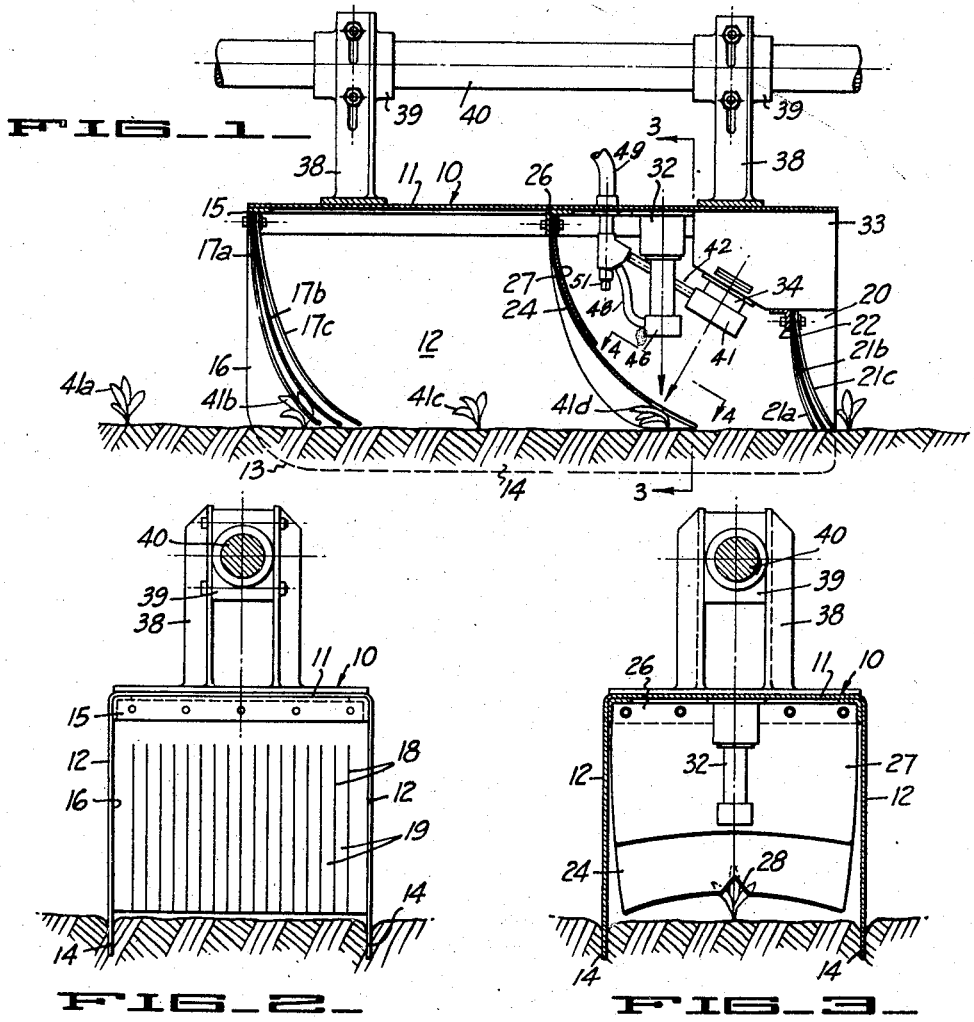
FIG_1_
FIG_2_　　　　FIG_3_
FIG_4_　　　　FIG_5_
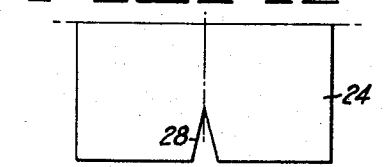
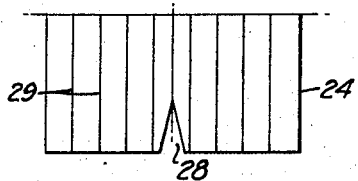
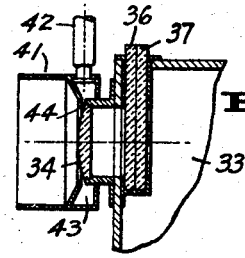
FIG_6_
INVENTOR.
Leo A. Marihart
BY Paul O. Flehr
ATTORNEY Patented Jan. 6, 1948

2,433,856

UNITED STATES PATENT OFFICE 2,433,856

APPARATUS FOR USE IN AGRICULTURAL MACHINES

Leo A. Marihart, Monterey County, Calif.

Application February 3, 1945, Serial No. 575,992

13 Claims. (Cl. 97—15)

This invention relates generally to devices making use of a photoelectric or light sensitive unit for controlling agricultural tools responsive to light rays received from plants. More particularly the invention relates to devices for use with an agricultural machine of the type disclosed in my co-pending application Serial No. 482,679, filed April 12, 1943, now Patent No. 2,400,562, issued May 21, 1946.

In my aforesaid application Serial No. 482,679 I have disclosed an agricultural machine making use of a frame adapted to travel along a row of plants, and having ground engaging hoeing devices carried by the frame and adapted to operate upon one or more plant rows. The hoeing devices are arranged to be controlled by photoelectric means in such a manner that actuating responses are secured from selected plants in a desired condition of growth. Such a machine can be arranged to perform various operations, including particularly thinning out plants to leave properly spaced selected plants, and eradication of weeds as the desired plants approach maturity. A part of the means employed to control the hoeing operations consists of an enclosure which passes over a row of plants being operated upon, and which carries a photoelectric or light sensitive unit in conjunction with a source of light. The present invention relates to what I have termed a "huddler."

It is an object of the invention to provide a device of the above character capable of securing a reliable light ray response from selected plants.

A further object of the invention is to provide apparatus of the above character capable of passing over plants without injury to the same, and with a displacement of the plant foliage in such a manner as to obtain an accurate light ray response indicative of location of the plant root center.

Another object of the invention is to provide apparatus of the above character capable of discriminating between different plants, as for example between selected plants and weeds.

Another object of the invention is to provide means serving to minimize the deleterious effects of dust upon the apparatus.

Further objects of the invention will appear from the following description in which the preferred embodiment has been set forth in detail in conjunction with the accompanying drawing.

Referring to the drawing:

Figure 1 is a side elevational view in section, showing a device incorporating the present invention.

Figure 2 is a front end view of the device shown in Figure 1.

Figure 3 is a cross-sectional view taken along the line 3—3 of Figure 1.

Figure 4 is a detail of the intermediate curtain viewed as indicated by line 4—4 of Figure 1.

Figure 5 is a view similar to Figure 4, but showing a modification.

Figure 6 is a cross-sectional detail illustrating a lens and filter for the photoelectric unit.

The apparatus illustrated in the drawing consists of a hood-like enclosure 10, formed in this instance by the connected sheet metal top wall 11 and side walls 12. The forward corners 13 of the lower edge portion 14 are shown curved whereby these edge portions dig into the surface of the ground as the device traverses a row of plants. The forward entrance opening 16 is screened off in such a manner as to largely exclude daylight from the interior of the device, without however interfering with passage of plants. For this purpose I have shown a plurality of flexible curtains 17a, 17b and 17c, each of which can be formed of a flexible sheet of natural or synthetic rubber, provided with a series of vertical slits 18. The upper edges of these curtains are shown clamped to the bracket 15, which in turn is secured to the top wall 11 of the enclosure. The slits in effect form resilient fingers or ribbons 19 which can readily drag over plants as indicated in Figure 1, without injury to the plant foliage. The successive curtains preferably have their slits 18 staggered in order to more effectively exclude light. The rear opening or exit 20 of the enclosure is provided with similarly formed flexible curtains 21a, 21b and 21c, which have their upper edges secured to the attaching bracket 22.

Within the enclosure 10 there is another curtain 24 which is for the purpose of positioning the plant in a particular manner while a light ray response is being secured. This curtain can likewise be made of resilient flexible material such as natural or synthetic rubber, and its upper edge is shown attached to bracket 26 whereby the curtain drapes downwardly and rearwardly over plants. The stiffness of this curtain will be dependent upon the character and size of plants being operated upon, and in this particular instance the upper portion of the curtain is shown being stiffened somewhat by a second sheet 27 of resilient material, such as rubber. The lower portion of curtain 24 is provided with an aperture or opening 28 which extends in what can be termed the response zone, and through which bent-over stem portions of plants can be viewed by the photoelectric unit. While the proportioning and shaping of this aperture may vary with different types and sizes of plants, in many instances as for example young lettuce plants, it is desirable to use a V-shaped opening aperture as shown in Figures 3 and 4. This aperture is in longitudinal alignment with the row of plants upon which the device operates. As shown in Figure 5 the curtain 24 can be given greater flexibility by providing it with slits 29.

In addition to the parts described above the apparatus is provided with an illuminating device or other light source 32 and a light responsive or photoelectric unit 33. Illuminating device 32 can be simply an electric lamp together with a simple lens system, whereby the light rays are generally focused upon the zone exposed by the aperture 28. The photoelectric unit can be of the type known to those skilled in the art, including for example a vacuum photoelectric tube connected to suitable electronic amplifying means, and a simple lens 34 which is generally focused upon aperture 28.

In operating upon certain plants such as lettuce it has been found desirable to secure a light response from the relatively light colored stem portions of the plant, as distinguished from the greener leaves of the same plants or the foliage of weeds. In order to aid in securing such color discrimination, it is desirable that the illuminating device 32 provide a substantial amount of infra-red rays, and that infra-red rays be relied upon largely for operation of the photoelectric unit. Likewise it is frequently desirable to utilize a polarizing screen either in conjunction with the light source, the photoelectric unit, or both. Thus in practice in order to secure a high percentage of infra-red rays from the illuminating device 32, I have utilized in this device an ordinary electric light globe operated at lower than rated voltage in order to increase production of infra-red light rays. Also in conjunction with the photoelectric unit and for thinning plants having whitish stems like lettuce, I have utilized a deep red filter 36 in conjunction with the polarizing screen 37. Use of a polarizing screen serves to minimize the amount of reflected light such as is frequently obtained from the waxy leaves of plants and from foliage wet with water or dew. A relatively high percentage of all such reflected light can be eliminated by utilizing polarizing screens for both the illuminating device and the photoelectric unit, thus causing operation practically entirely on "refracted" light or light emitted from the surface of the plant and corresponding to the true color of the same.

Under certain soil conditions a considerable amount of dust will be encountered with the result that dust will settle upon the exposed lens surfaces of the equipment, thus tending to reduce the intensity of the light response. Thus unless special means is employed to alleviate this difficulty it may be necessary to frequently interrupt operation of the apparatus to permit cleaning of the exposed lens surfaces. Accumulation of dust upon the exposed lens surfaces can be alleviated to a substantial degree by means which blankets the exposed surfaces of the lenses with dust free or filtered air. Thus as shown in Figure 6 the mounting for lens 34 carries a hood 41, having a connection with an air hose 42. Hose 42 delivers dust free air into the annular space 43, which in turn communicates with the main portion of the hood through the annular orifice 44. Air escaping through orifice 44 blankets the forward side of lens 34, thus tending to prevent dust in the atmosphere about the hood 41 from contacting or settling upon the exposed surface of the lens. The lens utilized in connection with the light source 32 can be provided with a similar hood 46, connected with air hose 48. Both of the hoses 42 and 48 can connect with a common air hose 49 which receives dust free or filtered air from suitable means such as a blower and filter. A certain amount of the dust free air from hose 49 can be introduced directly into the space to the rear of curtain 24 in order to minimize entrance of dust ladened air into the space surrounding the hoods 41 and 46.

Operation of the device described above can be outlined as follows: The enclosure 10 is connected in some suitable fashion to the rest of the equipment, as for example by providing uprights 38 adjustably attached to the collars 39. These collars in turn are fixed to the horizontal shaft 40 in such a manner as to permit forward and rear adjustment. Shaft 40 corresponds to the shaft 47 of my aforesaid Patent No. 2,400,562. The photoelectric unit 33 is connected to suitable relay means which in turn operates through a timer to control operation of the hoeing devices, substantially as disclosed in my Patent No. 2,400,562.

As the enclosure 10 is drawn along a row of plants, it is held in such a position that the margins or runner portions 14 extend into the ground as illustrated. In this manner the device is made immune to ground surface irregularities and at the same time light is excluded from the sides of the enclosure. The curtains 17a—17c exclude or screen out light which might otherwise come through the entrance 16, and at the same time these curtains permit plants to pass into the enclosure 10 without injury. In Figure 1 a plant 41a is shown about to enter the enclosure, and a plant 41b is shown passing beneath the curtains 17a to 17c. The ribbons 19 of the curtains drag over the foliage of the plant, and in addition to excluding light serve the useful purpose of shifting leaves close to the ground and generally directing all of the leaves forwardly to facilitate a subsequent light ray response from the whitish stem portions. After being passed by the curtains 17a—17c the plants somewhat recover as shown by plant 41c. The plants now pass beneath the curtain 24 as indicated by plant 41d. At this time the foliage of the plant is definitely gathered together and urged forwardly, and the plant is bent over as illustrated in Figure 1, whereby the stem portions of the plant near the ground are plainly visible through the aperture 28 as shown in Figures 3 and 4. During this period the bent over stem portions near the ground are illuminated by device 32, and light received from the stem portions operates the photoelectric unit 33. After passing the curtain 24 the plants pass through the egress curtains 21a—21c to leave the enclosure.

In the foregoing description reference is being made to plants passing through the enclosure, whereas it will be understood that in effect the enclosure passes over the row of plants.

Assuming use of color filters and polarizing screen for color discrimination, the response in effect discriminates with respect to both color and magnitude of the exposed stem area. The stem of a given plant is first seen by the photoelectric unit at the ground surface, and then an increasing area of the stem portions is seen as the device advances. When a given area is seen, determined by the adjusted sensitivity, the response is obtained. It will be evident that with a reasonable latitude of sensitivity adjustment one can secure a response when only a minor fraction of an inch of stem has been seen, thus making for accurate location of the root center.

A response obtained in the manner described above makes possible accurate control of hoeing devices for operation in close proximity to both sides of a selected plant. Sensitivity of the photoelectric unit can be readily adjusted by means known to those skilled in the art, as for example by controlling the sensitivity of the amplifying means employed, or the degree of illumination from illuminating device 32, so that no response is secured from a very immature plant, and so that a given area of stem must be seen to secure a response. The device can be made to discriminate to a high degree with respect to color, by color filters and by adjusting the sensitivity as described above, in order to secure a desired response from the stem portions of the desired selected plants, and in order to preclude response from other foliage, including weeds.

Aside from the adjustments previously mentioned various changes can be made to adapt the device to different operations desired, to different plants, and different stages of maturity of plants. In general the various curtains are made of material selected in accordance with the size and sturdiness of the plants to be operated upon. For the larger more sturdy plants, the curtains can be made of somewhat heavier material. Likewise as previously indicated the opening 28 can be varied for different types and sizes of plants. For very small plants this opening can be omitted and a very flexible curtain employed which will drape itself over the plants. Different light filters can be used depending upon the color characteristics of the stems of the plants. In general a filter should be used such as will tend to secure a response from the stem portions, without securing a false response from other foliage, such as leaves of poor plants, or the leaves or stems of weeds.

While the device is particularly adapted for use with the machine disclosed in my aforesaid Patent No. 2,400,562, it is believed that it is applicable to other types of agricultural machines, where it is desired to secure a light response for the operation of certain tools or appliances, and generally for the purpose of indicating and determining the location of a selected plant with a high degree of accuracy.

This application is a continuation in part of my copending application Serial No. 523,873, filed February 25, 1944 (now abandoned), and entitled "Apparatus for use in agricultural machines."

I claim:

1. In apparatus for securing a light ray response from plants located in a row, an enclosure adapted to travel along the ground over the row, the enclosure having means serving to screen exterior daylight from the interior of the same, a light responsive device directed to receive light from plants, a light source arranged to direct light toward plants passing through the enclosure, and means within the enclosure for positioning plants passing through the same in such a manner as to secure a light response from the photo electric unit.

2. In apparatus for securing a light ray response from plants located in a row, an enclosure adapted to travel along the ground over the row, the enclosure having a forward entrance and a rear exit for the plants, means serving to screen light from the entrance, means serving to screen off light from the exit, a light responsive device carried by the enclosure and directed to receive light from plants, a light source likewise carried by the enclosure and arranged to direct light towards plants passing through the same, and means within the enclosure for positioning plants passing through the same in such a manner as to secure a light response from the photoelectric unit.

3. In apparatus for securing a light ray response from plants located in a row, an enclosure adapted to travel along the ground over the row, the enclosure having a forward entrance and a rear exit for the plants, means serving to screen light from the entrance, means serving to screen off light from the exit, a light responsive device carried by the enclosure and directed to receive light from plants, a light source likewise carried by the enclosure and arranged to direct light towards plants passing through the same, means disposed within the enclosure intermediate the entrance and exits serving to bend over plants passing through the enclosure and to present bent-over stem portions of the plants to light from said source within the response zone of the photoelectric unit.

4. In apparatus for securing a light ray response from plants located in a row, an enclosure adapted to travel along the ground over a row of plants, the enclosure having a forward entrance and rear exit for the plants, means serving to screen off light from entering both the entrance and exits, means within the enclosure intermediate the entrance and exits serving to bend over plants passing through the enclosure and to present bent-over stem portions of the same within a predetermined response zone, a source of light carried by the enclosure and serving to illuminate the response zone, and a light response photoelectric unit directed to receive light from the response zone and to effect a response in accordance with light coming from bent-over stem portions of the plants.

5. Apparatus as in claim 4 in which said means within the enclosure consists of a flexible curtain draped downwardly and rearwardly and adapted to drag over plants.

6. Apparatus as in claim 4 in which said means within the enclosure consists of a flexible curtain draped downwardly and rearwardly and adapted to drag over plants passing through the enclosure, said curtain having an aperture extending from the lower edge of the same and adapted to expose bent-over portions of the plant.

7. In apparatus for securing a light ray response from plants located in a row, an enclosure adapted to travel along the ground over a row of plants, the enclosure having a forward entrance and a rear exit, means serving to screen out light from the entrance comprising a series of flexible ribbons depending within the entrance and adapted to flex to permit plants to pass into the enclosure, means to screen off light from entering the exit of the enclosure, and means for securing a light ray response from plants within the enclosure.

8. Apparatus as in claim 7 in which the aforesaid ribbons are arranged in a plurality of series, with the ribbons of each series staggered one behind the other.

9. In apparatus for securing a light ray response from plants located in a row, an enclosure adapted to travel along the ground over the row and having means serving to exclude exterior daylight from the interior of the enclosure, a light responsive device associated with the enclosure and directed to receive light from plants, a light source arranged to direct light towards plants passing through the enclosure, and means disposed within the enclosure serving to bend over plants passing through the enclosure and to present bent over stem portions of the plants to light from said source within the response zone of the photoelectric unit.

10. In apparatus for securing a light ray response from plants located in a row, an enclosure adapted to travel along the ground over the row and having means serving to screen out exterior daylight from the interior of the same, a light responsive device directed to receive light from said plants, said light responsive means including a lens having a surface of the same exposed to the interior of the enclosure, means adapted to illuminate plants within the enclosure, and means serving to minimize accumulation of dust upon the exterior surface of said lens.

11. In apparatus for securing a light ray response from plants located in a row, an enclosure adapted to travel along the ground over the row and having means serving to screen out exterior daylight from the interior of the same, a light responsive device directed to receive light from said plants, said light responsive means including a lens having a surface of the same exposed to the interior of the enclosure, means adapted to illuminate plants within the enclosure, and means serving to continuously blanket the exposed surface of said lens with dust free air.

12. In apparatus for securing a light ray response from plants located in a row, an enclosure adapted to travel along the ground over the row and having means serving to screen out exterior daylight from the interior of the same, a light responsive device directed to receive light from said plants, said light responsive means including a lens having a surface of the same exposed to the interior of the enclosure, means adapted to illuminate plants within the enclosure, a hood serving to generally enclose said lens, and means for introducing a stream of dust free air into said hood to blanket the exposed surface of the lens.

13. In apparatus for securing a light ray response from plants located in a row, a device adapted to travel along the ground over the row, light responsive means mounted to move with the device and directed to receive light from plants, a light source mounted for movement with the device and arranged to direct light towards plants passing beneath the device, and means carried by the device serving to engage and bend over plants passing beneath the same to cause the plants to present bent-over stem portions to light from said source and within the response zone of the light responsive means.

LEO A. MARIHART.

REFERENCES CITED

The following references are of record in the file of this patent:

UNITED STATES PATENTS

| Number | Name | Date |
| --- | --- | --- |
| 2,177,803 | Ferte et al. | Oct. 31, 1939 |

FOREIGN PATENTS

| Number | Country | Date |
| --- | --- | --- |
| 1,278 | Great Britain | June 7, 1858 |